(12) United States Patent  
Leroy et al.

(10) Patent No.: US 8,398,029 B2  
(45) Date of Patent: Mar. 19, 2013

(54) ON-BOARD DEVICE FOR MEASURING THE MASS AND THE POSITION OF THE CENTER OF GRAVITY OF AN AIRCRAFT

(75) Inventors: Julie Leroy, Marseilles (FR); Bertrand Tardy, Aix En Provence (FR)

(73) Assignee: Eurocopter, Marignane Cedex (FR)

( * ) Notice: Subject to any disclaimer, the term of this patent is extended or adjusted under 35 U.S.C. 154(b) by 2137 days.

(21) Appl. No.: 11/212,777

(22) Filed: Aug. 29, 2005

(65) Prior Publication Data

US 2006/0283239 A1    Dec. 21, 2006

(30) Foreign Application Priority Data

Sep. 23, 2004  (FR) ...................... 04 10064

(51) Int. Cl.  
*B64C 1/22*  (2006.01)

(52) U.S. Cl. ............... 244/137.1; 244/129.1; 244/118.1; 244/100 R; 177/136; 701/124

(58) Field of Classification Search ............... 244/137.1, 244/129.1, 118.1, 100 R; 177/136; 701/124  
See application file for complete search history.

(56) References Cited

U.S. PATENT DOCUMENTS

| 3,488,997 | A | * | 1/1970 | Kliever | 73/65.06 |
| 4,977,784 | A | * | 12/1990 | Eckerle | 73/862.041 |
| 5,067,674 | A | | 11/1991 | Heyche et al. | |
| 5,167,385 | A | | 12/1992 | Häfner | |
| 5,205,514 | A | | 4/1993 | Patzig et al. | |
| 5,521,827 | A | * | 5/1996 | Lindberg et al. | 701/124 |
| 6,237,406 | B1 | | 5/2001 | Nance | |
| 6,564,142 | B2 | * | 5/2003 | Godwin et al. | 701/124 |
| 7,089,791 | B2 | * | 8/2006 | Pradier | 73/494 |
| 2004/0056654 | A1 | | 3/2004 | Goldfine et al. | |

FOREIGN PATENT DOCUMENTS

WO   WO 2004/074787 A1   1/2004

* cited by examiner

*Primary Examiner* — J. Woodrow Eldred  
(74) *Attorney, Agent, or Firm* — Brooks Kushman P.C.

(57) ABSTRACT

The present invention relates to an on-board device for measuring the mass and the position of the center of gravity of an aircraft having a plurality of landing gears (T1, T2), each landing gear (T1, T2) being provided with at least one contact member (2) having a deformable element (3) that is deformable under the action of the weight of the aircraft when the aircraft is standing on a surface, and is remarkable in that the formable element (3) is provided with a bar (4) having an eddy current sensor (6) at its free end.

10 Claims, 2 Drawing Sheets

ON-BOARD DEVICE FOR MEASURING THE MASS AND THE POSITION OF THE CENTER OF GRAVITY OF AN AIRCRAFT

The present invention relates to an on-board device for measuring the mass and the position of the center of gravity of an aircraft, e.g. a rotorcraft.

BACKGROUND OF THE INVENTION

It is known that these two items of information are critical factors in the safe and effective operation of any aircraft. Prior to each flight, the pilot of a vehicle of this type must therefore make sure that the mass and the balancing of the aircraft do not exceed limits that are predefined by the manufacturer.

A first device is known, that is not on-board the aircraft itself, that serves to weigh an aircraft when empty, i.e. without any loading (passengers, fuel, . . . ), by arranging the aircraft under very precise conditions on a plurality of actuators, themselves disposed on special plates for avoiding introducing interfering forces. The empty mass is then added to the mass of the load in order to estimate the total mass of the aircraft before take-off and the position of its center of gravity.

Since measuring empty mass in this way is very difficult to perform, it is not performed prior to each flight, given the equipment and the time required, which is highly penalizing for that first device, particularly in terms of precision.

It is therefore preferred to use devices on-board the aircraft, to enable an accurate measurement to be obtained of the mass and the position of the center of gravity prior to each flight. In addition, such devices improve flight safety, since the pilot can then verify information coming from external sources that are not necessarily reliable, and relating to the mass of the load and to the position of the center of gravity.

The principle of such devices consists in determining deformation on a portion of each landing gear and in easily deducing therefrom the total mass and the position of the center of gravity of the aircraft.

U.S. Pat. No. 3,426,586 describes a second device of the above type. It consists in inserting a deformable tube inside the axle of each landing gear, the deformable tube being provided with strain gauges. The deformations measured in each tube by the strain gauges enable the total mass and the position of the center of gravity of the aircraft to be deduced.

Although that second device works, it nevertheless presents various drawbacks, in particular associated with strain gauges since they:

are difficult to put into place;
are sensitive to temperature, which requires the use of means specifically for temperature compensation; and
they need to be recalibrated frequently.

U.S. Pat. No. 4,312,042 discloses a third device using the bend angle of an element in each landing gear as a direct indication of the mass of an aircraft. That document teaches that the third device implements two inclinometers to determine the bending of the element in question.

Nevertheless, experience shows that arranging two inclinometers on each landing gear presents major difficulties that lead to difficulties in applying that third device.

OBJECTS AND SUMMARY OF THE INVENTION

An object of the present invention is to propose an on-board device for measuring the mass and the position of the center of gravity of an aircraft, and capable of overcoming the limitations of the above-mentioned devices.

According to the invention, an on-board device for measuring the mass and the position of the center of gravity of an aircraft having a plurality of landing gear, each landing gear being provided with at least one contact member having an element that is deformable under the action of the weight of the aircraft when it is standing on the ground or on any other surface, e.g. the deck of a ship, is remarkable in that the deformable element is provided with a bar having an eddy current sensor at its free end, the bar being arranged inside the deformable element.

The use of an eddy current sensor presents numerous advantages, since, in particular, sensors of this type are insensitive to temperature, which means that they can be used regardless of atmospheric conditions.

In addition, such a sensor can easily be fitted to existing deformable elements without requiring major modification thereto.

Preferably, if the contact member is a wheel, the deformable element that is fitted with the bar provided with an eddy current sensor is the wheel spindle, i.e. the axle on which the wheel is arranged.

As explained below, each eddy current sensor measures the distance between itself and a face of the deformable element, preferably the top face. This distance is representative of the deformation to which the deformable element containing the sensor is subjected under the action of the weight of the aircraft.

Each eddy current sensor then delivers a main signal that is proportional to the deformation of the deformable element as measured by means of a distance to processor means on-board the aircraft. The processor means, preferably an aircraft computer, uses these main signals to determine the mass and the position of the center of gravity of the aircraft.

In addition, to optimize the determination of the position of the center of gravity and in order to achieve accuracy, two additional measurement means, e.g. inclinometers, are arranged inside the fuselage of the aircraft. Each of these measurement means transmits a secondary signal to the processor means relating respectively to the roll and pitch angles of the aircraft. By means of this additional data, the processor means determines very accurately the position in three dimensions of the center of gravity of the aircraft, relative to the frame of reference (i.e. the pitch, roll and yaw axes) of the aircraft.

Finally, depending on the configuration of the landing gear, it can be difficult to lay electric cables all the way to the eddy current sensor. Thus, in the invention, a wireless transceiver is arranged on each landing gear to feed each of the sensors with electricity and to transmit the main signals to the processor means.

BRIEF DESCRIPTION OF THE DRAWINGS

The invention and its advantages appear in greater detail from the following description of embodiments given by way of illustration and with reference to the accompanying figures, in which.

MORE DETAILED DESCRIPTION

Elements that occur in more than one of the figures are given the same references in each of them.

Figure 1:
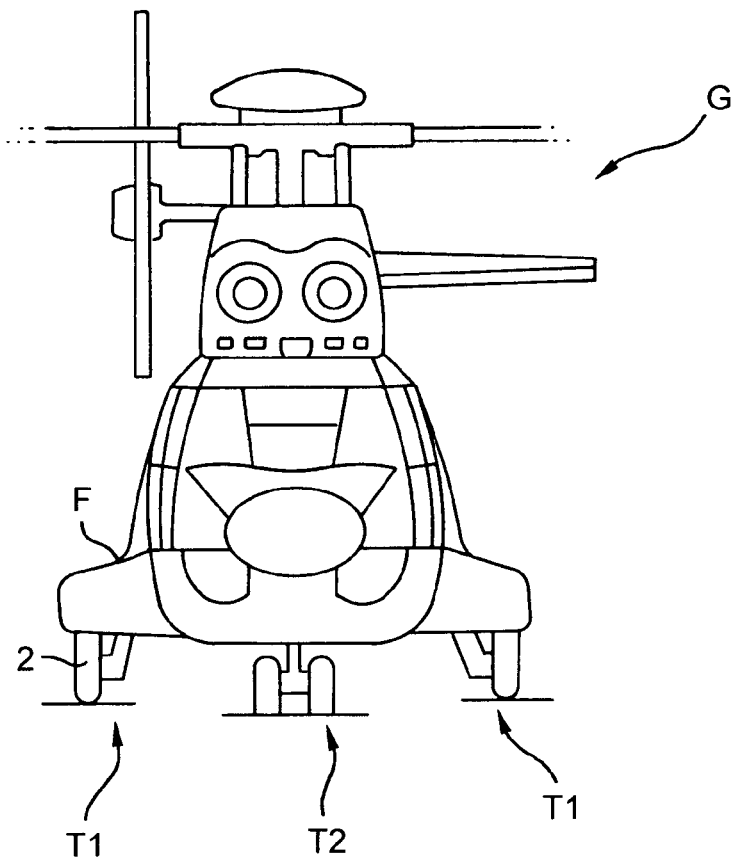
FIG. 1 is a front view of a rotorcraft provided with three landing gear.

FIG. 1 is a view of an aircraft, specifically a rotorcraft G having a fuselage F. On the ground, the rotorcraft G is supported by two landing gears T1 each provided with one contact member, and by one landing gear T2 provided with two contact members.

Under the action of the weight of the rotorcraft G, the landing gears T1, T2 deform. By measuring this deformation very accurately, it is possible to deduce by calculation the mass of the rotorcraft G and also the position of its center of gravity, where these two items of data are essential for piloting the rotorcraft G.

In order to perform these measurements, the device of the invention uses an eddy current sensor which determines the bending of a portion of a deformable element. This operation is performed on each landing gear T1, T2.

Furthermore, the contact members of the landing gears T1, T2 of the rotorcraft G are wheels 2. Under such circumstances, the selected deformable element is preferably the wheel spindle, i.e. the axle on which the wheel is arranged.

Nevertheless, the invention can naturally be used with other types of landing gear, for example an landing gear having skid or ski type contact members, by suitably selecting which deformable element should be fitted with eddy current sensors.

Figure 2:
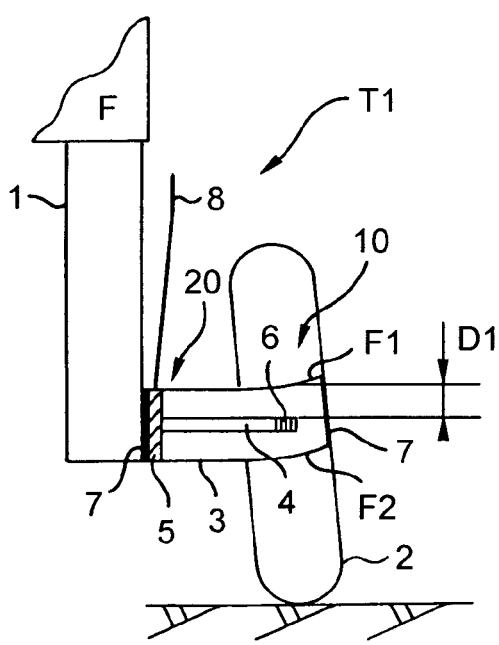
FIG. 2 shows the arrangement of a first embodiment of a bar inside a deformable element.

FIG. 2 shows how a first embodiment of a bar provided with an eddy current sensor is arranged inside a deformable element.

The landing gear T1 is of the wheeled type. The first and second ends 10 and 20 of a deformable element 3 are secured respectively to a wheel 2 and to a connection member 1, e.g. a damper, connected to the fuselage F. Under the action of the mass of the aircraft, the first end 10 of the deformable element is deformed.

A bar 4 is inserted inside the deformable element 3 and is then fastened thereto by conventional fastener means 5. In this embodiment, the fastener means 5 is situated at the second end 20 of the deformable element 3. Thus, the bar 4 does not move regardless of the mass of the aircraft, and consequently regardless of the resulting force, i.e. the weight of the aircraft.

Once the bar 4 is in position, the first and second ends 10 and 20 are closed using seals 7 so as to avoid deposits intruding, that might otherwise interfere with measurement.

In addition, a cable 8 serves notably to feed electricity to the eddy current sensor 6 arranged on the free end of the bar 4, i.e. its end remote from the fastener means 5.

The sensor 6 then measures the distance D1 between itself and a face of the deformable element 3, and it delivers a main signal which is proportional to said measured distance D1 to processor means arranged inside the fuselage F of the aircraft, the signal being delivered by the cable 8.

In order to measure the distance D1, it is preferable to use the top face F1 so as to avoid interference that might be caused by deposits, since such deposits will necessarily lie on the bottom face F2.

Figure 3:
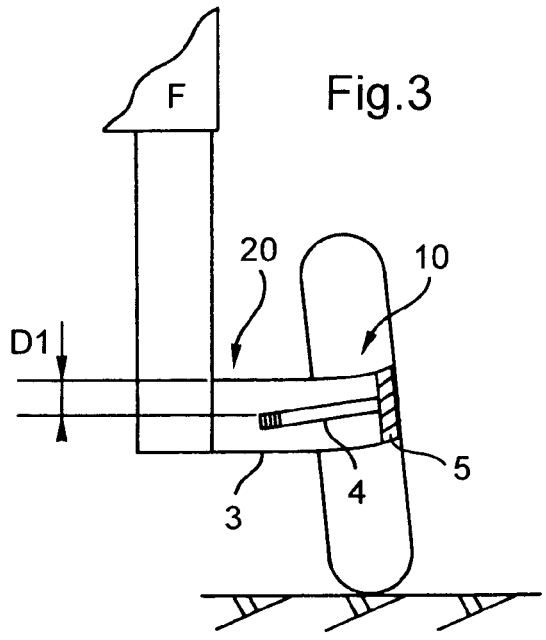
FIG. 3 shows the arrangement of a second embodiment of a bar inside a deformable element.

With reference to FIG. 3, in a second embodiment, the fastener means 5 is no longer fastened to the second end 20 of the deformable element 3, but instead to its first end 10. In this configuration, the bar 4 is movable. Under the effect of the weight of the aircraft, the first end 10 deforms, thereby tilting the fastener means 5 a little and consequently tilting the bar 4. The distance D1 measured by the eddy current sensor is thus increased.

As described above, in a first variant of the first and second embodiments of the invention, the cable 8 is connected directly to the processor means and to the electrical power supply.

Nevertheless, in a second variant, the cable 8 is connected to a wireless transceiver, of the very high frequency type for example, arranged on the landing gear.

This transceiver feeds electricity to the sensor 6 and transmits the main signal to the processor means. It serves firstly to reduce the amount of cabling, and secondly to avoid possible difficulties of installation. If the landing gear is free to swivel, it would otherwise be necessary to use complex electrical connection systems that would make the device considerably more complicated and could constitute an obstacle to it being installed on existing aircraft.

Figure 4:
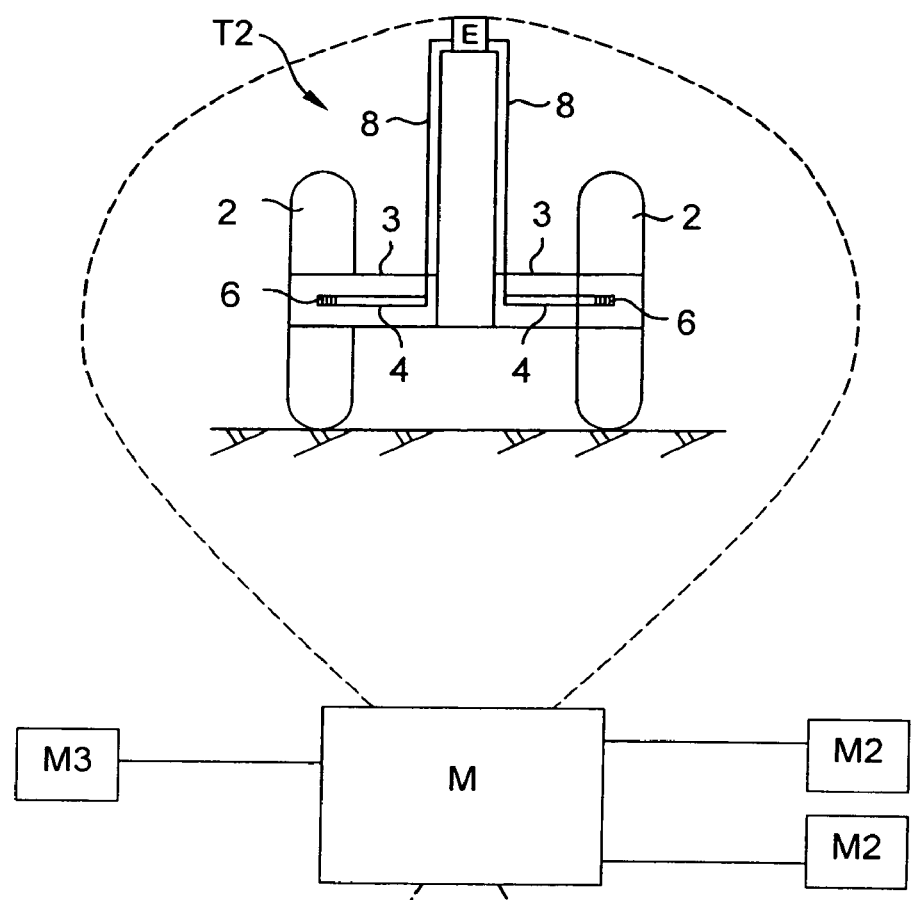
FIG. 4 is a diagram for explaining operation.
Figure 4:
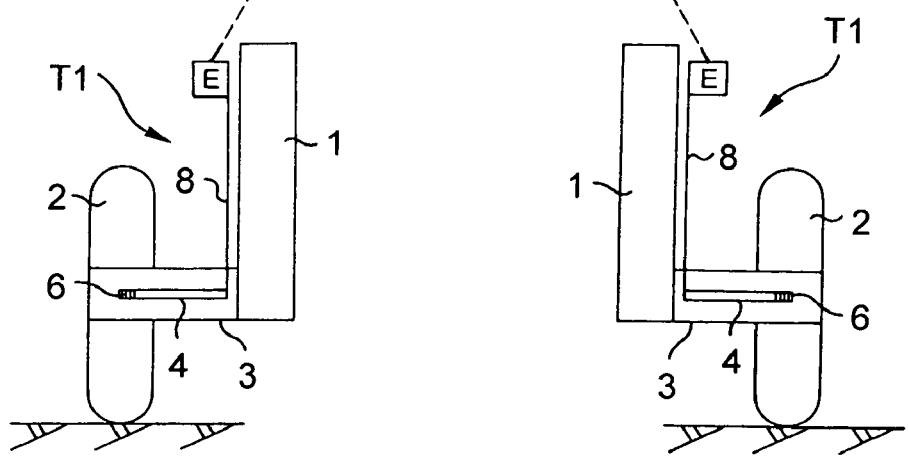

FIG. 4 is a diagram for explaining the operation of the invention.

Two landing gears T1 have one wheel 2 each, while the third landing gear T2 has two wheels 2.

As described above, each wheel 2 has a deformable element 3 passing therethrough and referred to as a spindle, and said element has an eddy current sensor 6 inserted therein. These sensors send respective main signals to processor means M, which signals are proportional to the distances D1 between the sensors 6 and the corresponding faces F1 of the deformable elements 3, the signals being transmitted via cables 8, or possibly via wireless transceivers E.

By analyzing the four main signals that reach it, the processor means M determines the forces applied to each of the deformable elements 3. It can then deduce the total mass of the aircraft, and also the position of its center of gravity, either by performing geometrical calculations or by using a neural network.

However, in order to calculate the position of the center of gravity of the aircraft very accurately relative to the frame of reference of the aircraft, and thus independently of its attitude relative to the ground, it is necessary to take account of said attitude in order to correct the calculations. For this purpose, two additional measurement means M2 transmit two secondary signals to the processor means M, relating respectively to the pitch angle and to the roll angle of the aircraft relative to the ground.

These additional measurement means M2 may be constituted by two inclinometers, measuring the pitch and roll angles respectively, and dedicated specifically to this application, or they may be any other means already present on the aircraft and performing this function.

Finally, the device includes display means M3 for informing an operator, e.g. the pilot, of the total mass of the aircraft and also of the position of its center of gravity.

Naturally, the present invention can be implemented in a wide variety of ways. Although several embodiments are described above, it will readily be understood that it is not conceivable to identify exhaustively all possible embodiments. It is naturally possible to replace any of the means described by equivalent means without going beyond the ambit of the present invention.

What is claimed is:

1. An on-board device for measuring the mass and the position of the center of gravity of an aircraft having a plurality of landing gears, each landing gear being provided with at least one contact member, said device comprising:

a hollow deformable element connected to a respective contact member, said deformable element deformable under the action of the weight of the aircraft when the aircraft is standing on a surface;
a bar arranged inside said deformable element; and
an eddy current sensor attached to a free end of said bar, wherein said sensor measures a distance between itself and a face of said deformable element.

2. A device according to claim 1, wherein said face is a top face of said deformable element.

3. A device according to claim 1, wherein said contact element (2) is a wheel and said deformable element (3) is the wheel spindle.

4. A device according to claim 1, including processor means (M) arranged inside the aircraft to receive a main signal from each sensor (6) in order to determine the mass and the position of the center of gravity said aircraft.

5. A device according to claim 1, including two additional measurement means (M2) arranged inside the fuselage of the aircraft respectively for determining the pitch angle and the roll angle of said aircraft.

6. A device according to claim 5, wherein said additional measurement means (M2) are inclinometers.

7. A device according to claim 5, wherein said processor means receives a secondary signal coming from each of said additional measurement means (M2), said secondary signals enabling it to optimize the calculated position for the center of gravity relative to the frame of reference of the aircraft.

8. A device according to claim 1, including a wireless transceiver (E) on each of said landing gear (T1, T2) for feeding electricity to each of the sensors (6) and for transmitting said main signals to said processor means (M).

9. An on-board device for measuring the mass and the position of the center of gravity of an aircraft having a plurality of landing gear, each said landing gear being provided with at least one contact member, said device comprising:
a hollow deformable element connected to a respective contact member, said deformable element being deformable under the action of a weight of the aircraft when the aircraft is standing on a surface;
a bar arranged inside said deformable element, said bar having a first free end and a second fixed end; and
an eddy current sensor attached to said free end of said bar as a longitudinal extension of said bar.

10. An on-board device for measuring the mass and the position of the center of gravity of an aircraft having a plurality of landing gear, each said landing gear being provided with at least one contact member, said device comprising:
a hollow deformable element connected to a respective contact member, said deformable element being deformable under the action of a weight of the aircraft when the aircraft is standing on a surface;
a bar arranged inside said deformable element; and
a single eddy current sensor, said single eddy current sensor being attached to a free end of said bar.

* * * * *